United States Patent
Rogers et al.

(10) Patent No.: US 8,010,477 B2
(45) Date of Patent: Aug. 30, 2011

(54) INTEGRATED PROBLEM SOLVING SYSTEM

(75) Inventors: Michael Roy Rogers, Brimfield, IL (US); Brian T. Lough, Peoria, IL (US)

(73) Assignee: Caterpillar Inc., Peoria, IL (US)

(*) Notice: Subject to any disclaimer, the term of this patent is extended or adjusted under 35 U.S.C. 154(b) by 779 days.

(21) Appl. No.: 12/076,178

(22) Filed: Mar. 14, 2008

(65) Prior Publication Data
US 2009/0234787 A1 Sep. 17, 2009

(51) Int. Cl.
*G06F 17/00* (2006.01)
*G06N 5/02* (2006.01)

(52) U.S. Cl. .................................................. 706/47
(58) Field of Classification Search .................. 706/47
See application file for complete search history.

(56) References Cited

U.S. PATENT DOCUMENTS

| | | |
|---|---|---|
| 4,648,044 A | 3/1987 | Hardy et al. |
| 4,783,752 A | 11/1988 | Kaplan et al. |
| 4,787,035 A | 11/1988 | Bourne |
| 4,791,550 A | 12/1988 | Stevenson et al. |
| 4,943,932 A | 7/1990 | Lark et al. |
| 5,119,470 A | 6/1992 | Highland et al. |
| 5,274,821 A | 12/1993 | Rouquie |
| 5,542,024 A | 7/1996 | Balint et al. |
| 5,905,894 A | 5/1999 | De Bonet |
| 6,832,365 B1 | 12/2004 | Chiles et al. |
| 2008/0052291 A1* | 2/2008 | Bender ............ 707/9 |

* cited by examiner

*Primary Examiner* — Michael Holmes
(74) *Attorney, Agent, or Firm* — Finnegan, Henderson, Farabow, Garrett & Dunner LLP

(57) ABSTRACT

A method for solving a problem is disclosed. The method may include receiving a problem description. The description of the problem may include a description of a host application module to be used for solving the problem. The method may further include training an embeddable logic library with baseline data and a known solution of the problem. The embeddable logic library may include a plurality of object components describing rules and procedures for processing data. The method may further include receiving input data associated with the problem, and processing the input data according to the problem description, using rules and procedures described by the object components in the embeddable logic library. The method may also include converting the processed data into a format required by the host application module, and providing the converted data to the host application module.

21 Claims, 4 Drawing Sheets

INTEGRATED PROBLEM SOLVING SYSTEM

TECHNICAL FIELD

The present disclosure relates generally to a problem solving system, and relates more particularly to an integrated problem solving system.

BACKGROUND

A business organization may be divided into departments, where each department may specialize in performing a specific task. Generally, large business organizations may include a greater number of departments than small business organizations. Each of those departments may use different customer-developed software applications to solve one or more specific problems, based on the functionality of the department. These software applications are usually written in different computer programming languages, such as Fortran and C/C++, etc. These programming languages may have difficulty in describing some problems and solutions due to the granularity the programmer has to operate at. Furthermore, computer programming languages have different syntaxes, semantics, and functionalities, and these differences introduce complexity into computer programming. Therefore, the encoding and logical evaluation mechanisms that need to be implemented are usually task-specific and do not have flexibility outside of the purpose they are designed for. In order to describe and solve the problem that the program is designed for, one must know the nature and details of the application, and must learn the syntax, semantic concepts, features and functionality of its programming language in advance.

As a result, integrating the customer-developed software applications being used by different department into a problem solving system and maintaining such a system becomes a challenging task. Some application problems may become computationally prohibitive to solve due to complexity, the very nature of the problem and/or solution, or the time to implement the solution and/or the maintenance of the resulting code base. For example, a software application used by a certain department may require an input dataset having a particular set of information. However, the unprocessed measurement data that may or may not contain the required information is usually very large in size. Manually processing the raw data into the required information is time consuming. In addition, since software applications used by different departments may be developed with different programming languages, each of them may require the input data to be organized in a particular format. However, the measurement data obtained from various measurement channels may not be organized in such a required format, and thus may not be correctly recognized by a customer-developed software application.

Consequently, there is a need to develop an integrated problem solving system by embedding a language-independent logic library and a logic engine to the customer-developed host application software as an interface to provide an orderly mechanism for describing complex data and relationships. For example, the logic library and logic engine may act as an expert system and provide mechanisms to mimic certain patterns of human operations such as classification, differentiation, symbolic pattern matching, etc. After the complex data are processed into information required by a host application, the logic engine may further organize the information into a format defined by the specific programming language of the host application.

At least one interface model has been developed to assist the interaction among software applications. For example, U.S. Pat. No. 6,832,365 to Chiles et al. ("the '365 patent") discloses a system and method for interacting with computer programming languages at a semantic level. The '365 patent describes a system and method that models computer programming language concepts in a plurality of objects and enables a computer programmer to interact with multiple programming languages through one code model interface. The programmer may employ the code model to locate an object that implements a specific functionality and return a code model object that implements that functionality.

Although the system and method described in the '365 patent may be effective for assisting a programmer to interact with various computer programming languages, it may nonetheless be suboptimal. For example, a user of a computer program still has to know the nature and details of the application in order to describe and solve the problem that the program is designed for. In particular, a user of the computer program has to screen and process a large amount of measurement data to sort out a set of information required by the application, and further organize the information according to a certain format. In addition, the interface model disclosed by the '365 patent does not provide a host system with a dynamic, responsive state-maintaining mechanism that has provisions to self-maintain, self-regulate, and to be the basis for an orderly mechanical learning system.

The integrated problem solving system of the present disclosure is directed towards overcoming one or more of the constraints set forth above.

SUMMARY

In one aspect, the presently disclosed embodiments may be directed to a method for solving a problem. The method may include receiving a problem description. The description of the problem may include a description of a host application module to be used for solving the problem. The method may further include training an embeddable logic library with baseline data and a known solution of the problem. The embeddable logic library may include a plurality of object components describing rules and procedures for processing data. The method may further include receiving input data associated with the problem, and processing the input data according to the problem description, using rules and procedures described by the object components in the embeddable logic library. The method may also include converting the processed data into a format required by the host application module, and providing the converted data to the host application module.

In another aspect, the presently disclosed embodiments may be directed to an integrated problem solving system. The integrated problem solving system may include an input interface configured to receive a problem description and input data associated with the problem. The integrated problem solving system may further include a computer-readable storage device configured to store an embeddable logic library and a logic program embeddable to a host application modules. The embeddable logic library may include a plurality of object components describing rules and procedures for processing data. The logic program may include instructions to process the input data according to the problem description, using the rules and procedures described by the plurality of object components in the embeddable logic library. The logic program may further include instructions to convert the processed data into a format defined by the problem description, and output the converted data to the host application module. The integrated problem solving system may also include a processor configured to execute the logic program.

DETAILED DESCRIPTION

Figure 1:
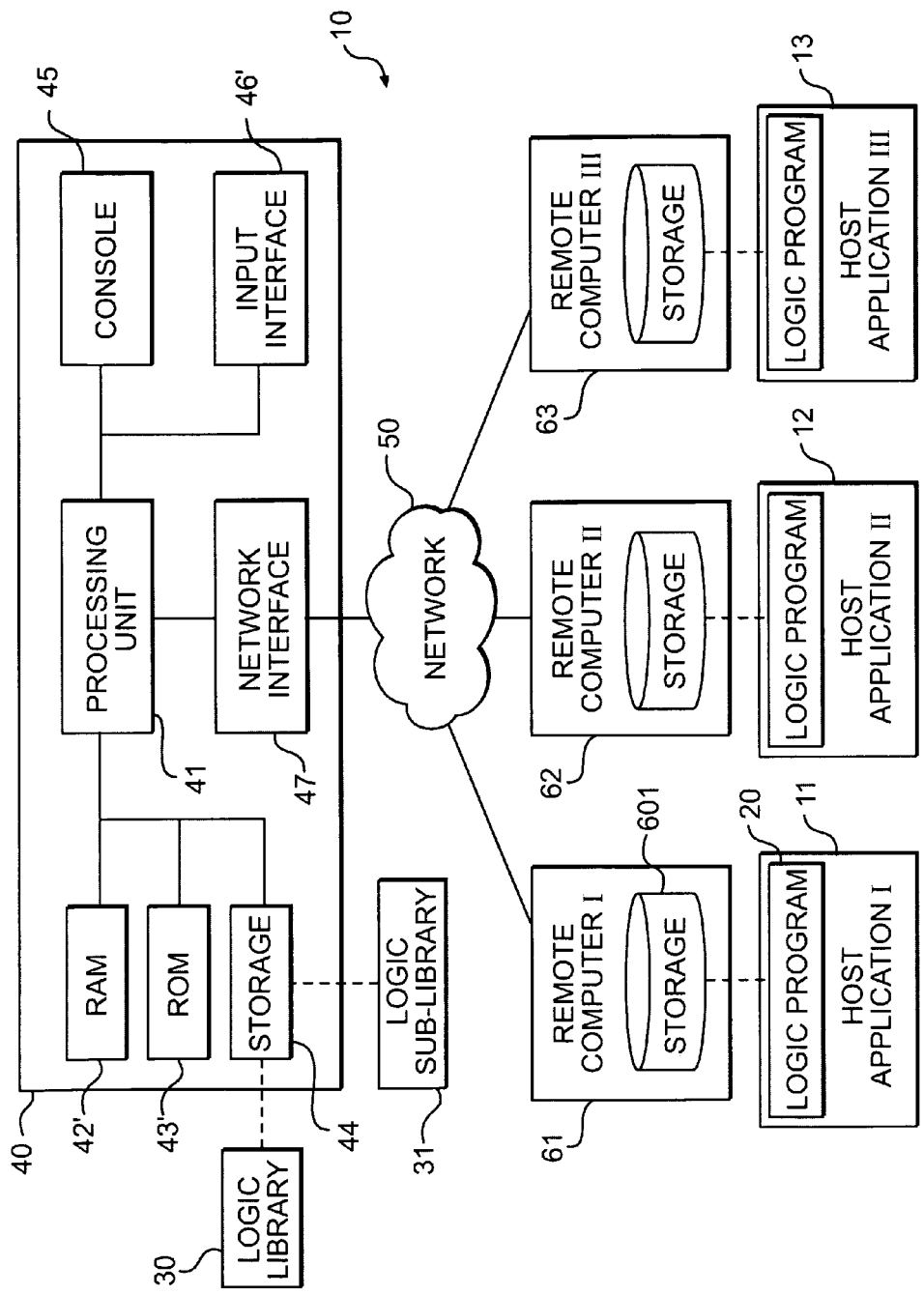
FIG. 1 is a schematic diagram of an integrated problem solving system, according to an exemplary embodiment of the present disclosure.

FIG. 1 is a schematic diagram of an integrated problem solving system 10, according to an exemplary embodiment of the present disclosure. Integrated problem solving system 10 may include a server system 40, a network 50, and a plurality of remote computers such as, for example, a remote computer I 61, a remote computer II 62, and a remote computer III 63.

Remote computers 61-63 may be owned and located in one or more departments, each specializing in one or more business areas of the business organization. Each department may have different host applications to perform one or more specific tasks, based on the functionality of the department. For example, remote computer I 61 may include a storage device 601 configured to store a host application module I 11. Accordingly, remote computer II 62 and remote computer III 63 may also include respective storage devices configured to store a host application module II 12 and a host application module III.

Each host application module may include customer-developed programs configured to perform a customer-defined task. Each host application module may be developed with different programming languages and tools, based on the purpose of the application. For example, host application module I 11 may be developed with C language, and be configured to detect an engine malfunction based on a set of input data. Host application module II 12 may be developed with Java™ language, and be configured to collect emission data over a network and analyze the collected emission data under various operation systems. Each host application module, depending on the language it is developed with and the specific task it is developed for, may require certain input information such as a series of input data. The host application module may also require that the input information be organized in a certain data format.

Each host application module may be directly accessed by end users for solving a problem the host application module is developed for. In this case, the end users need to provide the required input information in a format required by the host application module. However, in many cases, the required input information may not be readily available or available in the required format. Instead, the input information may be contained in a large and complex dataset measured using multiple measurement channels. Manually validating and sorting out the required input information and converting it into the required format requires specific skills and a lot of time. Furthermore, for a specific problem, a user may sometimes not know which host application module may provide the best solution to the problem.

In order to assist users to solve complex problems, integrated problem solving system 10 may include a server system 40 having a logic library 30, and each host application module may include an embeddable logic program 20. As shown in FIG. 1, server system 40 may include a processor 41, a random access memory ("RAM") 42, a read only memory ("ROM") 43, a storage device 44, a console 45, an input interface 46, and a network interface 47. It is contemplated that server system 40 may include additional, fewer, and/or different components than those listed above. It is understood that the type and number of listed devices are exemplary only and not intended to be limiting.

Processor 41 may be a central processing unit ("CPU"). Processor 41 may execute sequences of computer program instructions to perform various processes that will be explained later. The computer program instructions may be accessed and read from ROM 43, or any other suitable memory location, and loaded into RAM 42 for execution by processor 41. Depending on the type of sever system 40 being used, processor 44 may include one or more printed circuit boards, and/or a microprocessor chip.

Sever system 40 may be accessed and controlled by a user, such as an employee of a business organization that owns integrated problem solving system 10, using console 45 and input interface 46. Console 45 may provide a graphical user interface ("GUI") to provide information to users of server system 40. Additionally, console 45 may include an appropriate computer display device including, for example, a computer screen (not shown). Input interface 46 may be provided for users to input information into sever system 40, and may include, for example, a keyboard, a mouse, and/or optical or wireless computer input devices (not shown). Input interface 46 may also be configured to communicate with data collecting/generation devices such as, for example, sensors or machine controllers, and automatically receive data from these devices. Network interface 47 may provide communication connections such that server system 40 may be accessible remotely by remote computers 61-63 through computer networks.

Storage device 44 may include any type of mass storage suitable for storing information. For example, storage device 44 may include one or more hard disk devices, optical disk devices, or any other storage devices that provide data storage space. Storage device 44 may be configured to store a logic library 30. Logic library 30 may be a collection of program files describing rules and procedures for processing data into information. For example, the rules may define data relationships. Logic library 30 may be implemented as a system of symbols and objects in a symbolic computation language, or as rules, frames, and logic in other languages that may or may not support symbolic manipulation. Logic library may be implemented with an embeddable meta language such as, for example, Prolog.

In one embodiment of the present disclosure, storage device 44 may be also configured to store one or more logic sub-libraries 31. Logic sub-library 31 may include additional logic information related to the data. It is also contemplated that logic library 30 and/or one or more sub-libraries 31 may be stored on a computer readable medium, such as a hard drive, computer disk, CD-ROM, or any other suitable medium, and may be installed on remote computers 61-63.

Server system 40 may be connected with remote computers 61-63 via a network 50, such as, for example, an Internet. Storage device 44 may be in communication with host application modules 11-13. Each host application module may include an embeddable logic program 20, which may include instructions to process the original input data into information and convert the information into a specific format, according to the rules and procedures contained in logic library 30. Embeddable logic program 20 may further include instructions to perform maintenance and updates to logic library 30, in response to changing external states. For example, embeddable logic program 20 may include instructions to obtain additional logic information from the one or more logic sub-libraries 31, build new object components using the additional information and store the new object components in logic library 30.

Figure 2:
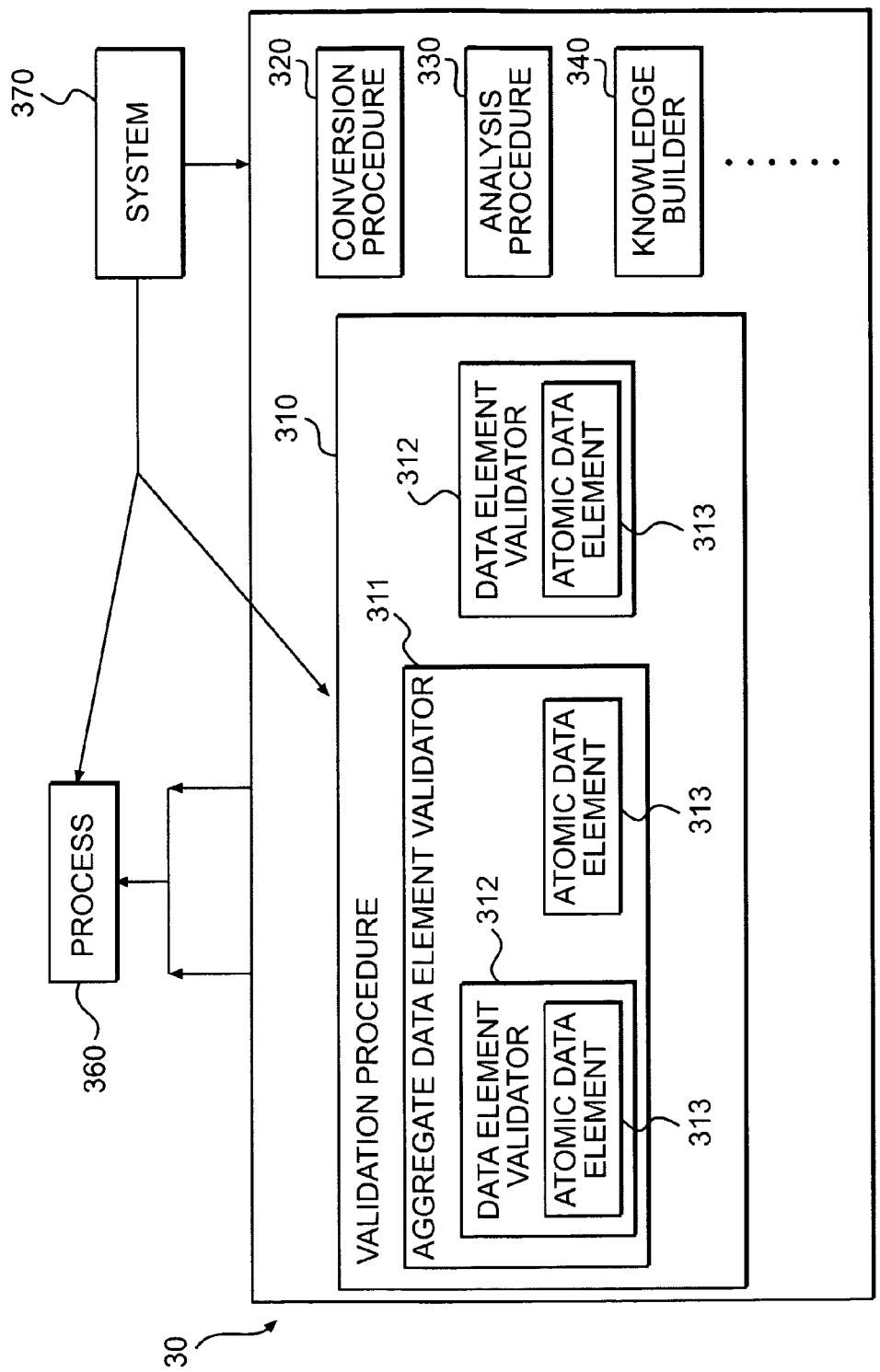
FIG. 2 is an illustration of a structure of a logic library, consistent with the disclosed embodiment shown in FIG. 1.

FIG. 2 is an illustration of a structure of logic library 30, consistent with the disclosed embodiment shown in FIG. 1. In one embodiment consistent with the present disclosure, logic library 30 may have a leveled structure. For example, level one may include a plurality of atomic data elements 313. Level two may include component sets such as, for example, data element validators 312 and/or aggregate data element validators 311. Data element validator 312 and/or aggregate data element validator 311 may validate atomic data elements 313 according to certain rules, and output a validation result as "valid" or "invalid." For example, data element validator 312 may determine whether a data point A and a data point B are valid, according to a data relationship between an atomic data element A and an atomic data element B. The data relationship between A and B may be an if-then logic, for example, if A=5, then B>10.

The collection of these data element validators may be aggregated into a validation procedure 310. Validation procedure 310 may be configured to compare a set of measured data against the data relationships described by data element validator 312 and aggregate data element validator 311. If any of the validator outputs "invalid," the related data may be determined as invalid by validation procedure 310. Similarly, the collections of atomic data elements 313 may also be organized into other component sets and aggregated into other procedures such as, for example, a conversion procedure 320, an analysis procedure 330, and a knowledge builder 340. A plurality of procedures may be aggregated into a process 360. Process 360 may be associated to perform complex tasks with interaction between objects at all levels achieved with a predicate object system 370.

Figure 3:
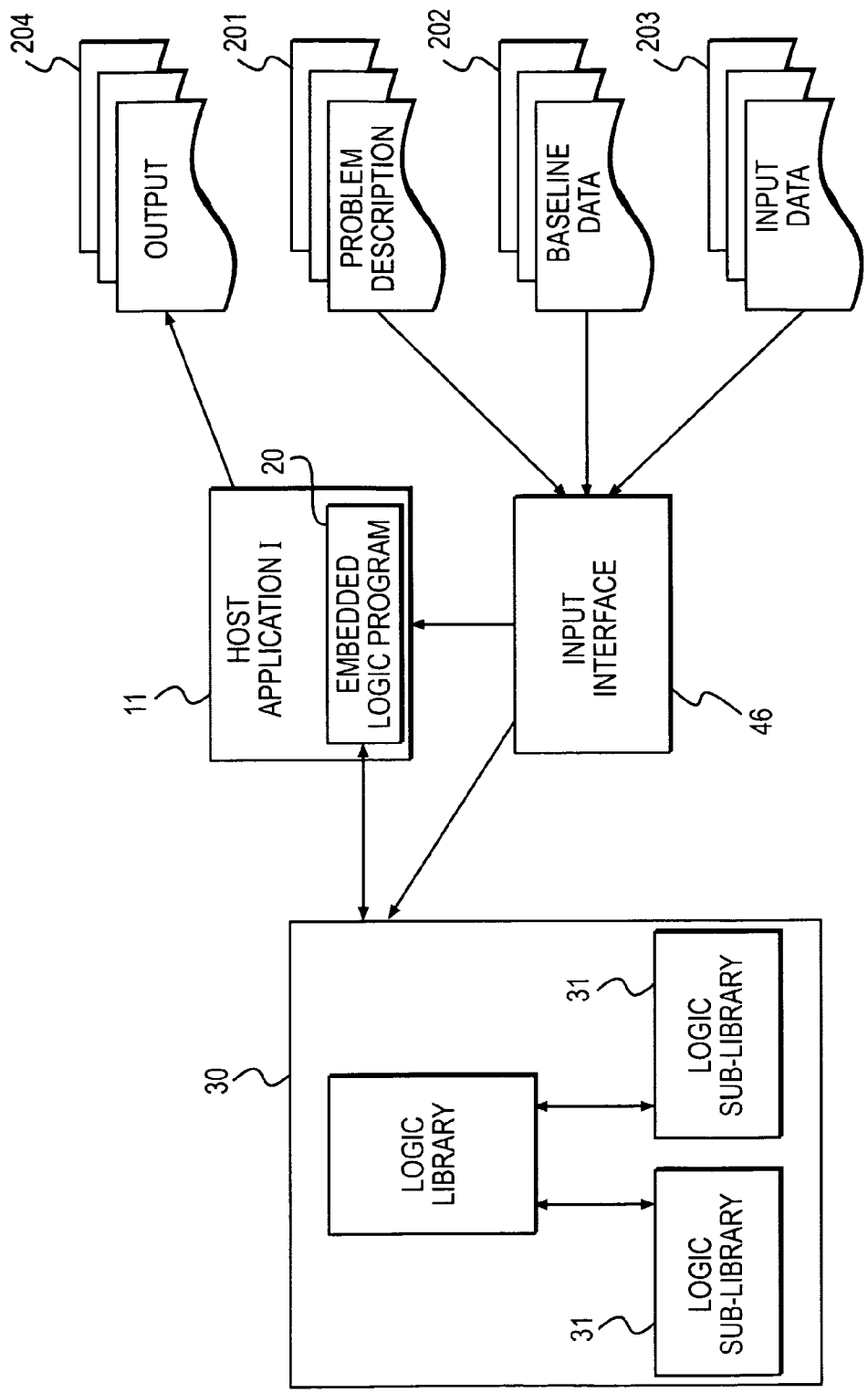
FIG. 3 is a schematic diagram of a problem solving process, according to an exemplary disclosed embodiment of the present disclosure.

Integrated problem solving system 10 may be accessed by users such as employees of one or more departments. Users may use integrated problem solving system 10 to solve complex problems which may include large-sized datasets and complex relationships among these datasets. FIG. 3 is a schematic diagram of a problem solving process, according to an exemplary disclosed embodiment of the present disclosure.

Input interface 46 may be configured to receive a problem description 201 from a user. Problem description 201 may include a summary of the problem, a description of available data for solving the problem, and a goal of the problem solution. In one embodiment consistent with the present disclosure, problem description 201 may further include a description of a host application module to be used for solving the problem. For example, host application module I 11 may be selected by the user for solving the problem and accordingly problem description 201 may include information of host application module I 11. Problem description 201 may include description of data required by host application module I 11, and information of a coding language with which host application module 11 is developed.

In some cases, the user may not know which host application module may be selected to solve the problem. Accordingly, in another embodiment consistent with the present disclosure, input interface 46 may send problem description 201 to logic library 30. Logic library 30 may be configured to select a host application module from a plurality of host application modules to solve the problem, based on problem description 201 and rules stored in logic library 30. For example, logic library 30 may include logic relationships between natures of problems and appropriate host application modules to be used for solving the respective problems. By matching problem description 201 with the natures of problems, logic library 30 may select host application module I 11 for solving the problem.

Host application module I 11 may include an embeddable logic program 20. Embeddable logic program 20 may include instructions to process data into information required by application module I 11, using the rules and data processing procedures described by the plurality of object components in logic library 30. For example, host application module I 11 may be configured to detect an electrical system fault in a machine based on a set of input data. Host application module I 11 may require input data including, for example, current distributions at various components of machine 10. The original measurement data, however, may include voltage values at set points of the machine, and resistance and inductances of various components. In this case, embeddable logic program 20 may process the original voltage measurements into current distribution, based on rules and procedures in logic library 30 which may describe the relationship between a voltage on a specific component and a current flowing through the same component. Furthermore, host application module I 11 may also require that the input data are converted to a certain data format. For example, application module I 11 may be developed with C language, and may have a special requirement on file input and output format. Accordingly, embeddable logic program 20 may further organize the processed data in the required data format.

Input interface 46 may be configured to receive baseline data 202 along with a corresponding known solution of the problem, and send the received baseline data 202 and known solution to embeddable logic program 20 of host application I 11. Embeddable logic program 20 may include instructions to train logic library 30 such that, if baseline data 202 are input into integrated problem solving system 10, the system may provide a solution the same or substantially the same as the known solution of the problem. For example, during the training process, the object components that are related to the problem and input data may be included and activated. Additionally, the rules and procedures described by the object components in logic library 30 may also be modified according to baseline data 202 and the known solution of the problem.

In one embodiment consistent with the present disclosure, during the training process of logic library 30, embeddable logic program 20 may also obtain additional logic information from logic sub-libraries 31, based on problem description 201 and baseline data 202. The obtained logic information may be processed and built into new object components, for example, by knowledge builder 340 in logic library 30. The new object components may be stored in logic library 30.

After logic library 30 is trained and new component objects are built, input interface 46 may be further configured to receive input data 203. Input data 203 may be entered by a user or automatically by measuring devices, such as sensors. Input data 203 may include a plurality of channels. For example, input data 203 may include measurement data obtained from a plurality of sensors in a machine. The number of channels may vary for different problems. The channel number of input data 203 may be specified in problem description 201. Input interface 46 may be configured to receive input data 203 with varying number of channels, and embeddable logic program 20 may include instructions to process the received channels of data.

Embeddable logic program 20 may further include instructions to process input data 203 according to problem description 201, using rules and procedures described by the object components in logic library 30. Consistent with one embodiment, the data processing may include a data validation process. Input data 203 may be validated, for example, using validation procedure 310 in logic library 30 based on the rules and procedures. Data that do not comply with the rules and/or procedures or are irrelevant to the problem may be determined as invalid and be removed from input data 203. For example, logic library 30 may include a rule describing a data relationship between an atomic data element A and an atomic data element B, such as, if A=5, then B>10. However, input data 203 may include a measured value A=5, and a measured value B=9. The relationship between the measured data contradict with the data relationship described in logic library 30. Accordingly, data element validiator 311 may determine that measured data A and B are invalid and the data may be removed.

Consistent with another embodiment, the data processing may also include a data inference process. New data element may be inferred from input data 203 based on the rules and procedures described in logic library 30. For example, logic library 30 may store a data relationship among atomic data element A, B and C, such that if A>4 and B<2, then C=5. Input data 203 may include a measured value A=7 and a measured value B=0. Therefore, a new data element C may be inferred by logic library that C=5. Consistent with yet another embodiment, the data processing may include a data analysis process. Input data 203 and/or the inferred new data may be analyzed, for example, using analysis procedure 330 in logic library 30.

According to one embodiment consistent with the present disclosure, processing input data 203 may use a backward chaining mechanism. The data processing may start from the goal of the problem solution described in problem description 201 and search for rules and procedures that connect the goal and the available input data 203. For example, host application I 11 may require an input data value C. Embeddable logic program 20 may include instructions to search for a data relationship containing data element C, such as, A>4 and B<2, then C=5. Based on the found data relationship, embeddable logic program 20 may include instructions to search for measured values of A and B in input data 203. If both values are found in input data 203, a new data value C may be inferred. If either value is not found in input data 203, for example, measured value A is not found, embeddable logic program 20 may further search for data relationships containing data element A. Information is chained backwards until all the data elements at the end of the chain are found in input data 203.

Alternatively or additionally, processing input data 203 may also use a forward chaining mechanism, in which case the data processing may start from data available in input data 203 and search for rules and procedures related to the available data. For example, input data 203 may include measured data values A and B. Embeddable logic program 20 may include instructions to search for a data relationship containing A and B, such as, A>4 and B<2, then C=5. Based on the found data relationship, embeddable logic program 20 may include instructions to infer a new data value C. Information is chained forward until all the data required by host application I 11 are inferred. The data processing may decide to use backwards chaining and/or forward chaining in an automated manner, based on the characteristics of input data 203 for each problem.

After embeddable logic program 20 has processed input data 203 into information required by host application I 11, it may further convert the information into a data format required by host application I 11, for example, using conversion procedure 320. According to one embodiment of the present disclosure, embeddable logic program 20 may determine a data format required by host application module I 11 based on the coding language with which host application module I 11 is developed. Embeddable logic program 20 may convert the processed data into the determined format, which may include, for example, a data format and an order that the data are organized. For example, host application module I 11 may be developed with C language and embeddable logic program 20 may convert data into a data format (e.g., integer, floating point, and Boolean, etc) recognizable by the host application module I 11. Embeddable logic program 20 may further organize the data into an input file that can be read by host application module I 11.

Embeddable logic program 20 may provide the processed data to host application I 11 and host application I 11 may perform a task, such as calculation, comparison, and diagnosis, etc., based on problem description 201. Host application I 11 may provide a problem solution as an output 204. Consistent with one embodiment, the processed data by embeddable logic program 20 may be provided directly as the problem solution in output 204. For example, the problem to be solved may be a data validation problem which may be accomplished by embeddable logic program 20 and logic library 30.

INDUSTRIAL APPLICABILITY

The disclosed integrated problem solving system 10 may have applicability in a business organization that uses a plurality of customer-developed host applications and needs a unification system for solving problems.

Integrated problem solving system 10 may be accessed by users such as employees of one or more departments. Users may use integrated problem solving system 10 to solve complex problems which may include large-sized datasets and complex relationships among these datasets. For example, a user may use integrated problem solving system 10 to analyze a large-sized engine test cell data measured from multiple channels, and perform complex set of procedures to validate the data of each channel and to detect an engine malfunction. During the validation, the data may be compared against a set of standard data that are known to be correct. If the data proves to be invalid, integrated problem solving system 10 may also be used to find what is not correct, why it is not correct, and what the most likely cure of the problem is. If the data proves to be valid, integrated problem solving system 10 may be further used to determine whether an engine malfunction exists.

Figure 4:
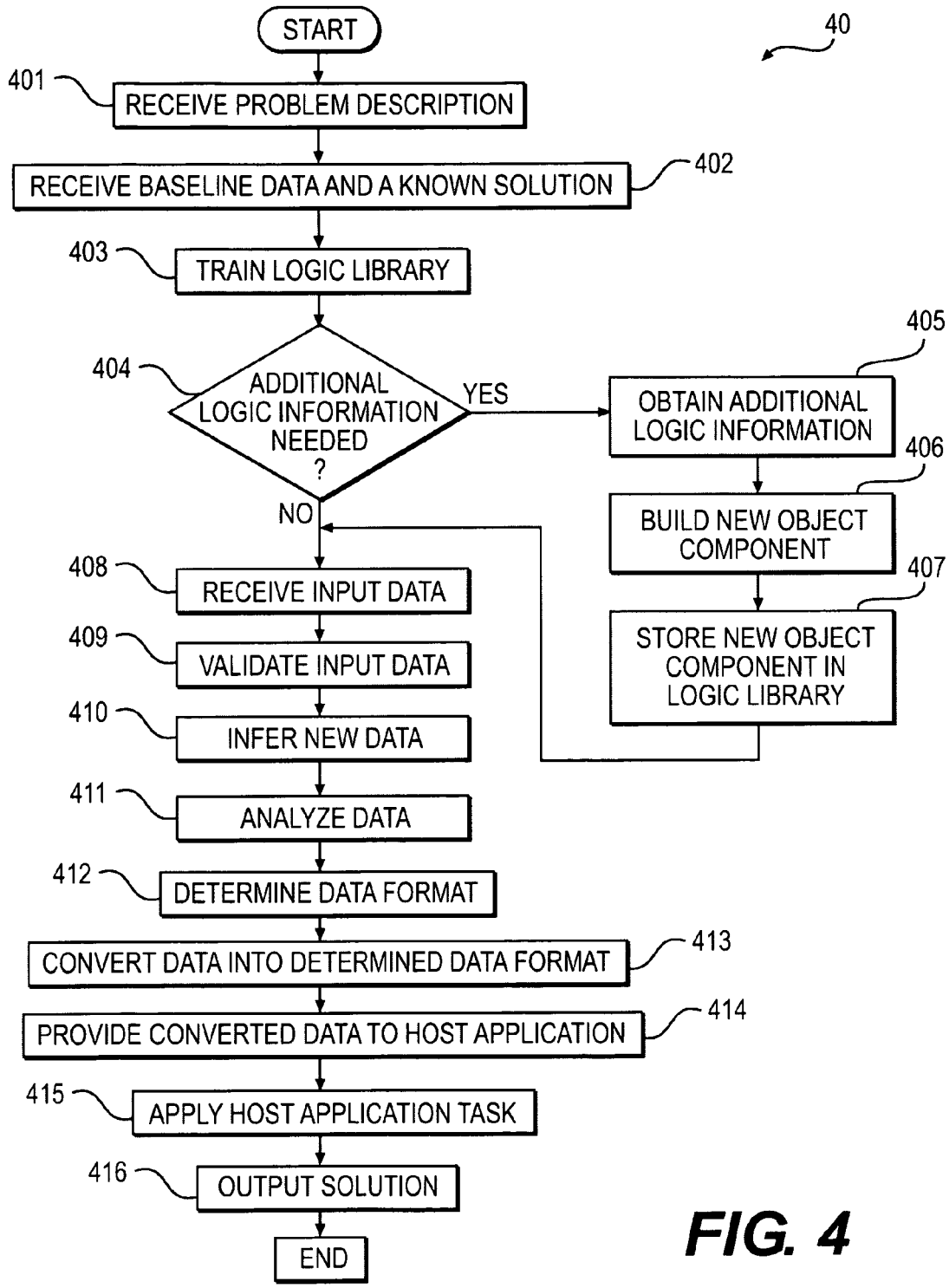
FIG. 4 is a flow chart of a problem solving process using an integrated problem solving system, consistent with the disclosed embodiment shown in FIG. 1 and FIG. 3.

FIG. 4 is a flow chart of a problem solving process 400 using integrated problem solving system 10, consistent with the disclosed embodiment shown in FIG. 1 and FIG. 3. Problem solving process 400 may start when input interface 46 receives a problem description 201 (Step 401). Problem description 201 may be entered by a user of integrated problem solving system 10. Alternatively, problem description 201 may also be received from another system, such as a control system. Problem description 201 may include a summary of the problem, a description of available data for solving the problem, and a goal of the problem solution. In one embodiment consistent with the present disclosure, problem description 201 may further include a description of a host application module to be used for solving the problem.

Input interface 46 may further receive baseline data 202 along with a known solution of the problem (Step 402). Baseline data 202 may be data that are known to be valid. The known solution of the problem may correspond to baseline data 202. For example, the problem may be to detect an engine malfunction in a machine. Baseline data 202 may include a plurality of engine operation measurement data obtained from a plurality of sensors in the machine. Baseline data 202 may be measured under a specific engine fault condition. Accordingly, the known solution of the problem may be a detection of the specific engine fault.

Input interface 46 may send the received problem description 201, baseline data 202 and the known solution of the problem to an embeddable logic program 20 in the host application module specified by problem description 201. Embeddable logic program 20 may train a logic library 30 using baseline data 202 and the known solution of the problem (Step 403). Training logic library 30 may include selecting and/or modifying object components in logic library 30 that are relevant to the problem.

Training logic library 30 may also include expanding logic library 30. As shown in FIG. 4, embeddable logic program 20 may determine whether additional logic information may be needed based on problem description 201 and baseline data 202 (Step 404). If additional logic information is needed (Step 404: Yes), embeddable logic program 20 may obtain the needed logic information from one or more logic sub-libraries 31 (Step 405). Logic sub-library 31 may be written with a language different from logic library 30 and/or the host application module that may be used to solve the problem. Therefore, the obtained logic information may not be directly used by logic library 30 and/or the host application module. Embeddable logic program 20 may build the obtained logic information into new object components (Step 406) and store the new object components in logic library 30 (Step 407). The additional logic information may then become a part of logic library 30.

If no additional logic information is needed (Step 404: No) or all additional information has been stored in logic library 30 (Step 407), input interface 46 may receive input data 203 (Step 408) and send input data 203 to embeddable logic program 20. Input data 203 may be entered by a user of integrated problem solving system 10. Alternatively, input data 203 may also be received from one or more measuring devices, such as sensors in a machine. Input data 203 may include multiple channels.

Embeddable logic program 20 may valid input data 203 based on the rules and procedures described by the object components in logic library 30 (Step 409). For example, embeddable logic program 20 may compare input data 203 against a set of standard data that are known to be correct. Embeddable logic program 20 may also verify input data 203 using data relationships described in logic library 30. Data that prove to be invalid may be removed or modified.

Embeddable logic program 20 may also infer new data from input data 203, based on the rules and procedures described by the object components in logic library 30 (Step 410). Embeddable logic program 20 may further analyze input data 203 and/or inferred new data, based on the rules and procedures described by the object components in logic library 30 (Step 411). According to one embodiment consistent with the present disclosure, in Steps 409-411, embeddable logic program 20 may use backward chaining mechanism for validating, inferring and analyzing data.

Embeddable logic program 20 may determine a data format that the processed data may be converted to, based on problem description 201 (Step 412). For example, embeddable logic program 20 may determine the data format according to the coding language with which the host application module is developed, such that the data may be recognized by the host application module. Embeddable logic program 20 may convert the processed data into the determined format (Step 413) and provide the converted data to the host application module (Step 414). The host application module may perform a task based on problem description 201 (Step 415) and output a solution of the problem (Step 416), after which problem solving process 400 may terminate.

It will be apparent to those skilled in the art that various modifications and variations can be made in the disclosed integrated problem solving system 10 without departing from the scope of the disclosure. Additionally, other embodiments of the disclosed system and method will be apparent to those skilled in the art from consideration of the specification. It is intended that the specification and examples be considered as exemplary only, with a true scope of the disclosure being indicated by the following claims and their equivalents.

What is claimed is:

1. A computer-implemented method for solving a problem, the method comprising:
   receiving a problem description, wherein the problem description includes a description of a host application module to be used for solving the problem;
   training an embeddable logic library with baseline data and a known solution of the problem, wherein the embeddable logic library includes a plurality of object components describing rules and procedures for processing data, the rules including data relationships;
   receiving input data associated with the problem;
   processing, using one or more computer processors, the input data according to the problem description, using rules and procedures described by the object components in the embeddable logic library;
   converting the processed data into a format required by the host application module; and
   providing the converted data to the host application module.

2. The method of claim 1, wherein the problem description further includes a description of input data required by the host application module.

3. The method of claim 1, wherein the description of the host application module includes information of a coding language with which the host application module is developed.

4. The method of claim 1, wherein training the embeddable logic library further includes:
   obtaining logic information associated with the input data from one or more logic sub-libraries;
   building the logic information into a new object component; and
   store the new object component in the embeddable logic library.

5. The method of claim 1, wherein the embeddable logic library is written with an embeddable meta language.

6. The method of claim 1, wherein processing the input data includes:
   validating the input data using the rules and procedures stored in the embeddable logic library; and
   removing data that do not comply with the rules and procedures or are irrelevant to the problem.

7. The method of claim 6, wherein processing the input data further includes:

inferring new data based on the rules and procedures stored in the embeddable logic library; and analyzing data based on the data relationships and rules stored in the embeddable logic library.

8. The method of claim 1, wherein processing the input data uses a backward chaining mechanism.

9. The method of claim 1, wherein the embeddable logic library further includes:
   a plurality of procedures aggregated by the plurality object components; and
   one or more processes aggregated by the plurality of procedures.

10. The method of claim 3, wherein converting the processed data further includes determining a data format required by the host application module based on the coding language with which the host application module is developed.

11. The method of claim 1 further includes automatically selecting a host application module from a plurality of host application modules, based on the problem description.

12. An integrated problem solving system, comprising:
   an input interface configured to receive a problem description and input data associated with the problem, the problem description including a description of a host application module to be used for solving the problem;
   a first computer-readable storage device configured to store an embeddable logic library, wherein the embeddable logic library includes a plurality of object components describing rules and procedures for processing data; and
   a second computer-readable storage device configured to store a logic program embeddable to the host application module, wherein the logic program includes instructions to:
      process the input data according to the problem description, using the rules and procedures described by the plurality of object components in the embeddable logic library;
      convert the processed data into a format required by the problem description; and
      output the converted data to the host application module;
      and a processor configured to execute the logic program.

13. The integrated problem solving system of claim 12, wherein the input interface is configured to receive input data from a varying number of measurement channels.

14. The integrated problem solving system of claim 12, wherein the input interface is further configured to receive baseline data and a known solution of the problem, and wherein the logic program further includes instructions to train the embeddable logic library with baseline data and the known solution of the problem.

15. The integrated problem solving system of claim 12, wherein the first computer-readable storage device is further configured to store one or more logic sub-libraries, wherein each logic sub-library includes logic information associated with the input data.

16. The integrated problem solving system of claim 15, wherein the logic program further includes instructions to:
   obtain logic information associated with the input data from the one or more logic sub-libraries;
   build the logic information into a new object component; and
   store the new object component in the embeddable logic library.

17. The integrated problem solving system of claim 12, wherein the instruction to process the input data includes instructions to:

validate the input data using the rules and procedures stored in the embeddable logic library;

remove data that do not comply with the rules and procedures or are irrelevant to the problem; and infer new data based on the rules and procedures stored in the embeddable logic library.

18. The integrated problem solving system of claim 12, wherein the embeddable logic library further includes:
   a plurality of procedures aggregated by the plurality object components; and
   one or more processes aggregated by the plurality of procedures.

19. A computer-implemented method for solving a problem, the method comprising:
   receiving a problem description, wherein the problem description includes a description of a host application module to be used for solving the problem and information relating to a coding language with which the host application module is developed;
   training an embeddable logic library with baseline data and a known solution of the problem, wherein the embeddable logic library includes a plurality of object components describing rules and procedures for processing data;
   receiving input data associated with the problem;
   processing, using one or more computer processors, the input data according to the problem description, using rules and procedures described by the object components in the embeddable logic library;
   converting the processed data into a format required by the host application module based at least one the information relating to the coding language with which the host application module is developed; and
   providing the converted data to the host application module.

20. A computer-implemented method for solving a problem, the method comprising:
   receiving a problem description, wherein the problem description includes a description of a host application module to be used for solving the problem;
   automatically selecting a host application module from a plurality of host application modules based on the problem description;
   training an embeddable logic library with baseline data and a known solution of the problem, wherein the embeddable logic library includes a plurality of object components describing rules and procedures for processing data;
   receiving input data associated with the problem;
   processing, using one or more computer processors, the input data according to the problem description, using rules and procedures described by the object components in the embeddable logic library;
   converting the processed data into a format required by the host application module; and
   providing the converted data to the host application module.

21. A computer-implemented method for solving a problem, the method comprising:
   receiving a problem description, wherein the problem description includes a description of a host application module to be used for solving the problem;
   automatically selecting a host application module from a plurality of host application modules based on the problem description;
   training an embeddable logic library with baseline data and a known solution of the problem, wherein the embeddable logic library includes a plurality of object components describing rules and procedures for processing data;

receiving input data associated with the problem;

processing, using one or more computer processors, the input data according to the problem description, using rules and procedures described by the object components in the embeddable logic library, the processing including:

validating the input data using the rules and procedures stored in the embeddable logic library; and removing data that do not comply with the rules and procedures or are irrelevant to the problem;

converting the processed data into a format required by the host application module; and providing the converted data to the host application module.

* * * * *